(12) United States Patent
Yuan et al.

(10) Patent No.: US 12,217,740 B2
(45) Date of Patent: *Feb. 4, 2025

(54) DETECTION AND/OR ENROLLMENT OF HOT COMMANDS TO TRIGGER RESPONSIVE ACTION BY AUTOMATED ASSISTANT

(71) Applicant: GOOGLE LLC, Mountain View, CA (US)

(72) Inventors: Yuan Yuan, Redwood City, CA (US); Bibo Xu, San Jose, CA (US); Tianyu Wang, Los Altos, CA (US); Anurag Jain, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,286

(22) Filed: Feb. 19, 2024

(65) Prior Publication Data

US 2024/0194190 A1 Jun. 13, 2024

Related U.S. Application Data

(63) Continuation of application No. 16/973,384, filed as application No. PCT/US2019/065656 on Dec. 11, 2019, now Pat. No. 11,948,556.

(Continued)

(51) Int. Cl.
*G10L 15/08* (2006.01)
*G06F 40/279* (2020.01)
(Continued)

(52) U.S. Cl.
CPC ............ *G10L 15/08* (2013.01); *G06F 40/279* (2020.01); *G06N 20/00* (2019.01); *G06V 40/19* (2022.01); *G10L 2015/088* (2013.01)

(58) Field of Classification Search
CPC ... G10L 15/08; G10L 2015/088; G10N 20/00; G06F 40/279; G06V 40/19
See application file for complete search history.

(56) References Cited

U.S. PATENT DOCUMENTS

| 8,719,039 B1 | 5/2014 | Sharifi |
| 9,275,637 B1 | 3/2016 | Salvador et al. |

(Continued)

FOREIGN PATENT DOCUMENTS

| CN | 102270042 | 12/2011 |
| CN | 105320726 | 2/2016 |

(Continued)

OTHER PUBLICATIONS

European Patent Report; Communication pursuant to Article 94(3) EPC issued in Application No. 19832259.6; 5 pages; dated Mar. 29, 2023.

(Continued)

*Primary Examiner* — Mohammad K Islam
(74) *Attorney, Agent, or Firm* — Gray Ice Higdon

(57) ABSTRACT

Techniques are described herein for detecting and/or enrolling (or commissioning) new "hot commands" that are useable to cause an automated assistant to perform responsive action(s) without having to be first explicitly invoked. In various implementations, an automated assistant may be transitioned from a limited listening state into a full speech recognition state in response to a trigger event. While in the full speech recognition state, the automated assistant may receive and perform speech recognition processing on a spoken command from a user to generate a textual command. The textual command may be determined to satisfy a frequency threshold in a corpus of textual commands. Consequently, data indicative of the textual command may be enrolled as a hot command. Subsequent utterance of another textual command that is semantically consistent with the (Continued)

textual command may trigger performance of a responsive action by the automated assistant, without requiring explicit invocation.

20 Claims, 8 Drawing Sheets

Related U.S. Application Data

(60) Provisional application No. 62/915,248, filed on Oct. 15, 2019.

(51) Int. Cl.
*G06N 20/00* (2019.01)
*G06V 40/19* (2022.01)

(56) References Cited

U.S. PATENT DOCUMENTS

| | | | |
|---|---|---|---|
| 9,361,885 B2 | 6/2016 | Ganong, III et al. | |
| 9,373,321 B2 | 6/2016 | Bapat et al. | |
| 9,378,733 B1* | 6/2016 | Vanhoucke | G10L 15/08 |
| 9,548,047 B2 | 1/2017 | Clark et al. | |
| 9,691,384 B1 | 6/2017 | Wang et al. | |
| 9,792,901 B1* | 10/2017 | Saleem | G10L 15/22 |
| 10,510,340 B1* | 12/2019 | Fu | G10L 15/18 |
| 10,515,637 B1* | 12/2019 | Devries | G10L 15/1822 |
| 10,832,668 B1* | 11/2020 | Devries | G10L 15/22 |
| 11,521,599 B1* | 12/2022 | Jose | G06F 17/15 |
| 11,694,682 B1* | 7/2023 | Reinspach | G10L 13/027 704/251 |
| 2011/0153323 A1 | 6/2011 | Kim et al. | |
| 2015/0112690 A1* | 4/2015 | Guha | G06F 21/81 704/275 |
| 2015/0130716 A1 | 5/2015 | Sridharan et al. | |
| 2015/0161989 A1* | 6/2015 | Hsu | G10L 15/08 704/251 |
| 2016/0133259 A1 | 5/2016 | Rubin et al. | |
| 2017/0345425 A1 | 11/2017 | Ikeno | |
| 2018/0182390 A1 | 6/2018 | Hughes et al. | |
| 2018/0342021 A1 | 11/2018 | Gulec | |
| 2019/0279637 A1* | 9/2019 | Li | G10L 15/08 |
| 2019/0318729 A1* | 10/2019 | Chao | G10L 15/14 |
| 2020/0090653 A1 | 3/2020 | Luo | |
| 2020/0202843 A1* | 6/2020 | Shah | H04L 65/80 |
| 2021/0134286 A1* | 5/2021 | Burton | G06F 9/453 |
| 2021/0248189 A1 | 8/2021 | Kadono | |
| 2021/0335342 A1 | 10/2021 | Yuan | |
| 2022/0068297 A1* | 3/2022 | Patel | G10L 15/08 |
| 2023/0197082 A1* | 6/2023 | Wang | G06F 9/451 704/251 |

FOREIGN PATENT DOCUMENTS

| | | | |
|---|---|---|---|
| CN | 106157512 | 11/2016 | |
| CN | 109410952 | 3/2019 | |
| CN | 109493849 | 3/2019 | |
| CN | 110045830 | 7/2019 | |
| CN | 110100277 | 8/2019 | |
| EP | 2750129 | 7/2014 | |
| EP | 3723082 | 10/2020 | |
| EP | 3723082 A1 * | 10/2020 | G06F 3/167 |
| JP | 2002082748 A | 3/2002 | |
| JP | 2005011089 | 1/2005 | |
| JP | 2008145989 | 6/2008 | |
| JP | 2011003086 | 1/2011 | |
| JP | 2014071449 | 4/2014 | |
| JP | 2017211608 | 11/2017 | |
| WO | 2018205083 | 11/2018 | |
| WO | 2019103007 | 5/2019 | |
| WO | 2020040744 | 2/2020 | |
| WO | 2020040745 | 2/2020 | |
| WO | WO-2020040744 A1 * | 2/2020 | G06F 3/165 |
| WO | WO-2020040745 A1 * | 2/2020 | G06V 40/16 |
| WO | 2021076164 | 4/2021 | |

OTHER PUBLICATIONS

European Patent Office; Examination Report issued for Application No. 19832259.6, 5 pages, dated Sep. 13, 2023.
European Patent Office; Intention to Grant issued for Application No. 19832259.6, 64 pages, dated Sep. 16, 2024.
The Korean Patent Office; Notification of First Office Action issued in Application No. 10-2022-7001309; 14 pages; dated Oct. 28, 2024.
Chinese Patent Office; Notification of First Office Action issued in Application No. 201980097616.6; 32 pages; dated Sep. 30, 2024.

* cited by examiner

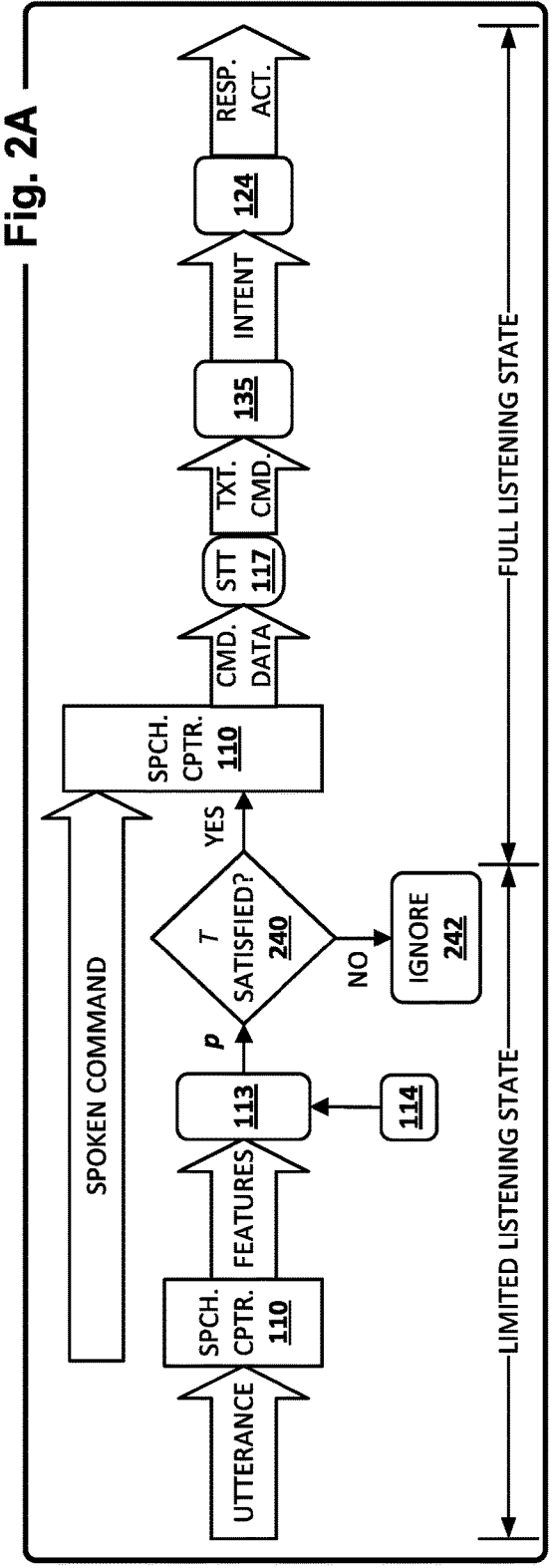
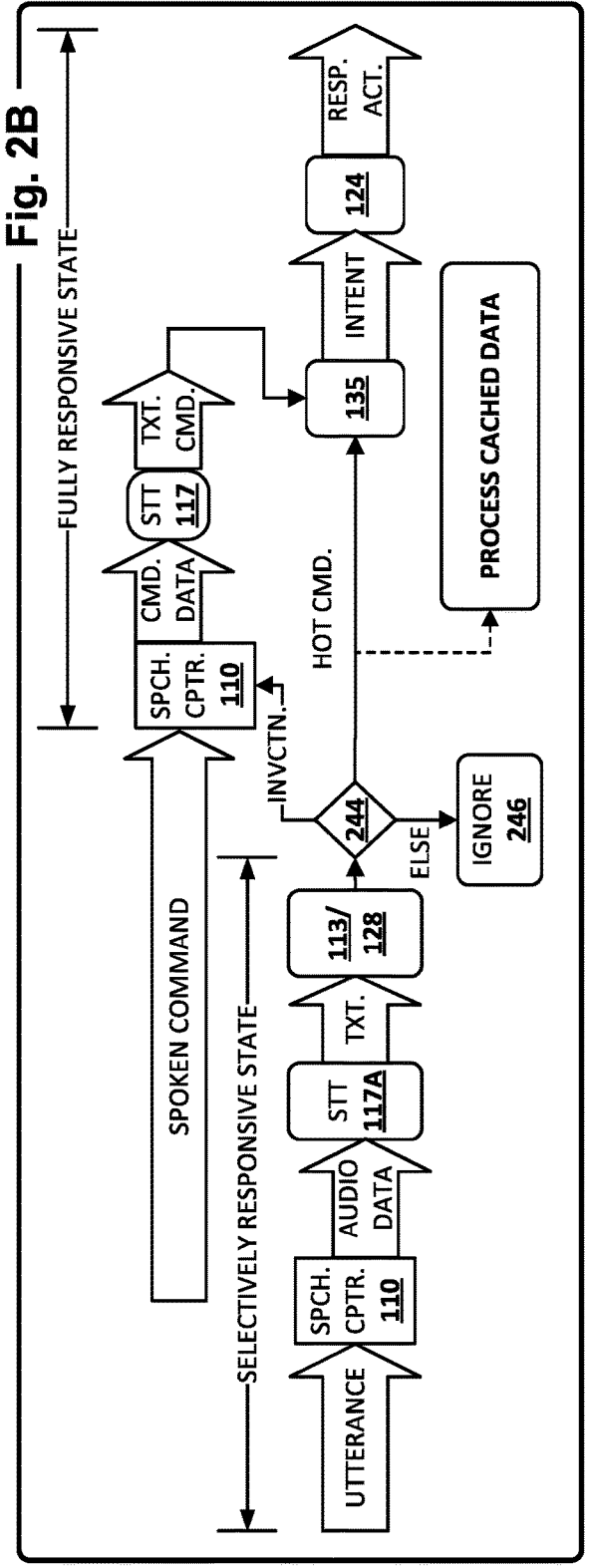

DETECTION AND/OR ENROLLMENT OF HOT COMMANDS TO TRIGGER RESPONSIVE ACTION BY AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests using free form natural language input which may include vocal utterances converted into text and then processed and/or typed free form natural language input.

In many cases, before the automated assistant can interpret and respond to a user's request, it must first be "invoked," e.g., using predefined oral invocation phrases that are often referred to as "hot words" or "wake words." Thus, many automated assistants operate in what will be referred to herein as a "limited listening state" or "default listening state" in which they are always "listening" to audio data sampled by a microphone for a limited (or finite, or "default") set of hot words. Any utterances captured in the audio data other than the default set of hot words are ignored. Once the automated assistant is invoked with one or more of the default set of hot words, it may operate in what will be referred to herein as a "full listening state" wherein for at least some time interval after invocation, the automated assistant performs speech-to-text ("STT") processing (also referred to as "speech recognition processing") of audio data sampled by a microphone to generate textual input, which in turn is semantically processed to determine a user's intent (and to fulfill that intent).

Operating the automated assistant in the default listening state provides a variety of benefits. Limiting the number of hot words being "listened for" allows for conservation of power and/or computing resources. For example, an on-device machine learning model may be trained to generate output that indicates when one or more hot words are detected. Implementing such a model may require only minimal computing resources and/or power, which is particularly beneficial for assistant devices that are often resource-constrained. Along with these benefits, operating the automated assistant in the limited hot word listening state also presents various challenges. To avoid inadvertent invocation of the automated assistant, hot words are typically selected to be words or phrases that are not often uttered in everyday conversation (e.g., "long tail" words or phrases). However, there are various scenarios in which requiring users to utter long tail hot words before invoking an automated assistant to perform some action can be cumbersome.

SUMMARY

Techniques are described herein for detecting and/or enrolling (or commissioning) new "hot commands" that are useable to cause an automated assistant to perform responsive action(s) without having to first be explicitly invoked. As used herein, a "hot command" refers to one or more words or phrases that, when spoken, are responded to by the automated assistant without requiring that the automated assistant first be explicitly invoked and transitioned into a fully listening/responsive state in which the automated assistant attempts to respond to any captured utterance.

In some implementations, speech recognition may be implemented wholly or at least partially onboard a client device such as a standalone interactive speaker, which may or may not also include other components such as a display, a camera, and/or other sensors. In some such implementations, the automated assistant may perform speech recognition processing on spoken utterances captured at time(s) other than immediately after the automated assistant is invoked. These other times may include, for instance, whenever a user is detected in proximity to the computing device, whenever user speech is detected and determined to not originate from another machine, such as a television or radio, and so forth.

In other words, in some implementations, a computing device implementing an automated assistant configured with selected aspects of the present disclosure may perform speech recognition processing on more detected utterances than a conventional automated assistant, which as discussed above may only perform speech recognition processing on utterances detected after it is explicitly invoked. The textual snippets generated from this speech recognition processing may be analyzed using techniques described herein to determine whether they should trigger responsive action by the automated assistant, should be enrolled as hot commands, or should be ignored or discarded. In many implementations, even though textual snippets are generated for a greater portion of detected utterances than with conventional automated assistants, techniques described herein may be performed locally on the client device, thereby avoiding transmission of the textual snippets to a cloud-based system.

In some implementations, hot commands may be selectively enrolled in a hot command library based on various "hot command enrollment criteria." One hot command enrollment criterion may be a textual command-received after explicit invocation of the automated assistant-satisfying a frequency threshold in a corpus of textual commands. The corpus may be associated with a particular user (e.g., the speaker) or with a population of users. For example, suppose a particular user invokes the automated assistant some threshold number of times to issue the specific command, "turn off the lights." Before the threshold is satisfied, this command may not trigger responsive action by the automated assistant without it being explicitly invoked first. However, once the threshold is satisfied (e.g., the user has invoked the automated assistant ten times to turn off the lights), the textual command "turn off the lights" may be enrolled in the hot command library. Subsequently, whenever that same command is issued by the same user without first invoking the automated assistant, the automated assistant will nevertheless take responsive action, e.g., by turning off the lights in the same room.

In some implementations, particularly those in which speech recognition processing is only performed after the automated assistant is explicitly invoked, enrollment of a textual command in the hot command library may cause the aforementioned on-device machine learning model to be further trained to detect the textual command moving forward. In other implementations in which the automated assistant performs (onboard) speech recognition processing on other utterances captured at other times, a textual snippet generated from each utterance may be compared to those stored in the hot command library. A match may occur where, for instance, a given textual snippet is sufficiently similar to, and/or semantically consistent with, a record in the hot command library.

Sufficient similarity may be found where, for instance, there is an exact match between the textual snippet and an enrolled hot command, or where an edit distance between the textual snippet and an enrolled hot command satisfies some threshold (e.g., less than some edit distance), or even when an embedding of the textual snippet is within some Euclidian distance of an embedding of a hot command. In some implementations, the hot command library may store only embeddings of previously-enrolled textual commands. Semantic consistency may exist between two commands where, for instance, corresponding slots of the commands can receive semantically similar values. For example, "set a time for ten minutes" and "set a timer for one hour" are semantically consistent because the slot they share is a time interval.

In other implementations, textual snippets generated from spoken utterances may be deemed hot commands based on factors other than (or in addition to) enrollment in a hot command library. For example, in some implementations, speech recognition processing may be performed on multiple utterances (e.g., without requiring explicit invocation of the automated assistant) to generate multiple textual snippets. Meanwhile, one or more vision sensors may generate vision data that, when analyzed, reveals the speaker's gaze during each utterance. If, while speaking a particular utterance that yielded a particular textual snippet, the speaker was looking at a computing device on which the automated assistant is at least partially implemented, then that particular textual snippet may be deemed a hot command.

Another signal that may be considered, e.g., for enrollment in the hot command library or to determine whether a given textual snippet was meant as a command for the automated assistant, is whether one or more smart appliances were operated by a person immediately after the utterance was captured. Suppose a user says, "turn on the lights," but then another user operates a switch to turn on some smart lights. That would suggest the command "turn on the lights" should not be enrolled or interpreted as a hot command. However, suppose in the same scenario, the smart lights are not turned on and silence follows. That may suggest the command "turn on the lights" should be interpreted in at least this instance as a hot command, and may also increase the likelihood that the command should be enrolled as a hot command moving forward, especially if this scenario occurs multiple times.

In some implementations, a method performed by one or more processors is provided that includes: operating an automated assistant using one or more of the processors; transitioning the automated assistant from a limited listening state into a full speech recognition state in response to a trigger event; while in the full speech recognition state, receiving, by the automated assistant, a spoken command from a user; performing speech recognition processing on the spoken command to generate a textual command; determining that the textual command satisfies a frequency threshold in a corpus of textual commands; and in response to the determining, enrolling data indicative of the textual command as a hot command, wherein subsequent to the enrolling, utterance of another textual command that is semantically consistent with the textual command triggers performance of a responsive action by the automated assistant, without requiring explicit invocation of the automated assistant.

In various implementations, the trigger event may include detection of one or more default hot words in audio data captured by a microphone. In various implementations, the corpus of textual commands may include a corpus of textual commands generated by the user. In various implementations, the corpus of textual commands may include a corpus of textual commands generated by a population of users, including the user.

In various implementations, the method may further include applying the textual command as input across a machine learning model to generate output. The output may be indicative of a probability that the textual command was directed to the automated assistant, wherein the enrolling is further in response to the probability satisfying a threshold. In various implementations, the method may further include detecting, based on vision data captured by one or more cameras, that the user's gaze is directed at a computing device on which the automated assistant is at least partially implemented, wherein the enrolling is further in response to the detecting.

In various implementations, the enrolling may be further in response to a determination that, during a predetermined time interval after the spoken command, no additional utterances are detected. In various implementations, the enrolling may be further in response to a determination that, during a predetermined time interval after the spoken command, no responsive action was taken by a person.

In various implementations, the method may further include, in response to the enrolling, caching data indicative of the textual command or the textual command itself in local memory of a computing device that at least partially implements the automated assistant. In various implementations, the method may further include triggering the textual command subsequent to the enrolling based on the cached data, without the textual command being explicitly invoked, in order to cache information that is responsive to the textual command, wherein subsequent to the triggering, the cached information is output in response to a subsequent invocation of the textual command, in lieu of the textual command being triggered. In various implementations, subsequent to the caching, invocation of the textual command may cause the data indicative of the textual command to be transmitted directly to a smart appliance over one or both of a local area network ("LAN") and a personal area network ("PAN"). In various implementations, receipt of the data indicative of the textual command may cause the smart appliance to perform a responsive action.

In various implementations, the data indicative of the textual command may include a template that includes one or more slots to receive one or more subsequent parameters that are semantically consistent with one or more parameters provided in the spoken command received from the user.

In another related aspect, a method implemented using one or more processors may include: receiving audio data captured at one or more microphones, wherein the audio data includes first and second spoken utterances; performing speech recognition processing on the audio data to generate first and second textual snippets corresponding to the first and second spoken utterances; in response to a determination that the first textual snippet satisfies one or more hot command criteria, performing a responsive action based on the first textual snippet; and in response to a determination that the second textual snippet fails to satisfy the one or more hot command criteria, discarding or disregarding the second textual snippet without performing another responsive action.

In various implementations, the one or more hot command criteria may include enrollment of a textual snippet under consideration in a hot command library. In various implementations, the hot command library may include textual snippets that, when spoken, trigger performance of a responsive action by the automated assistant, without requiring detection of one or more default hot words or transition of the automated assistant into an active listening state.

In various implementations, the method may further include detecting, based on vision data captured by one or more cameras, a first gaze of a user while the user provided the first spoken utterance and a second gaze of the user while the user provided the second spoken utterance. In various implementations, the one or more hot command criteria may include a gaze being directed at a computing device on which the automated assistant is at least partially implemented.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 2A and 2B schematically depict two different examples of how utterances may be processed to invoke the automated assistant, in accordance with various implementations.

DETAILED DESCRIPTION

Figure 1:
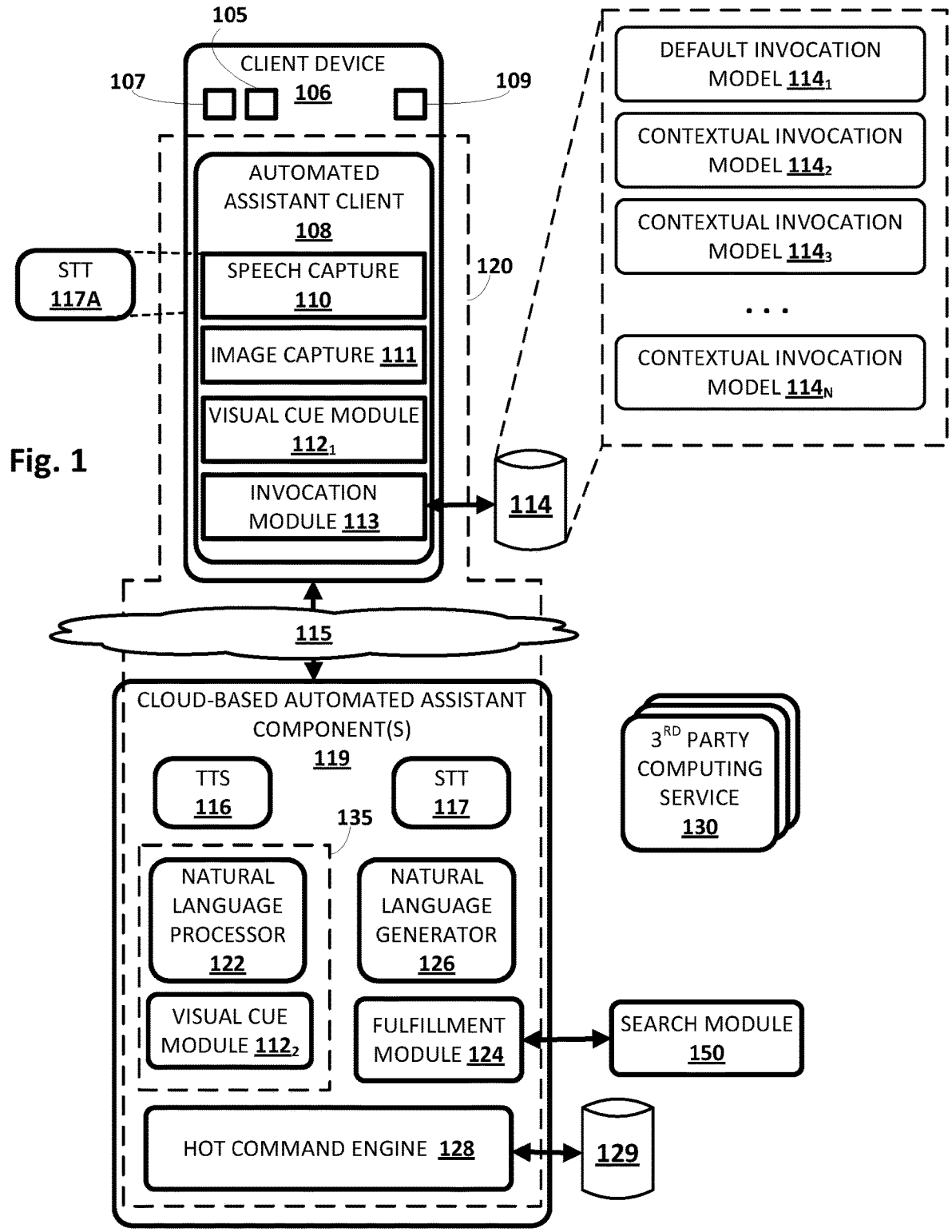
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 115.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module 112$_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to take various actions.

Additionally or alternatively, in some implementations, client device 106 may include one or more proximity sensors 105. Proximity sensor(s) may take various forms, such as passive infrared ("PIR") sensors, radio frequency identification ("RFID"), a component that receives a signal emitted from another nearby electronic component (e.g., Bluetooth signal from a nearby user's client device, high- or low-frequency sounds emitted from the devices, etc.), and so forth. Additionally or alternatively, vision sensors 107 and/or a microphone 109 may also be used as proximity sensors, e.g., by visual and/or audibly detecting that a user is proximate.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation ("hot" or "wake") phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, a visual cue module $112_1$, and/or an invocation module 113. In other implementations, one or more aspects of speech capture module 110, image capture module 111, visual cue module 112, and/or invocation module 113 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as a microphone 109 or other pressure sensor to capture an audio recording of a user's utterance(s). In some implementations, the utterances may be stored at least temporarily as audio data in a buffer, such as a ring buffer. Various types of processing may be performed on this audio recording for various purposes. In some implementations, image capture module 111, which may be implemented using any combination of hardware or software, may be configured to interface with vision sensor 107 to capture one or more image frames (e.g., digital photographs) that correspond to a field of view of the vision sensor 107.

In various implementations, visual cue module $112_1$ (and/or cloud-based visual cue module $112_2$) may be implemented using any combination of hardware or software, and may be configured to analyze one or more image frames provided by image capture module 111 to detect one or more visual cues captured in and/or across the one or more image frames. Visual cue module $112_1$ may employ a variety of techniques to detect visual cues. For example, Visual cue module $112_2$ may use one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques (also referred to herein as "speech recognition processing"). As shown in FIG. 1, in some implementations, speech capture module 110 may include an onboard STT module 117A that is used in addition to, or instead of, the below-described cloud-based STT module 117. Additionally or alternatively, in some implementations, speech capture module 110 may be configured to perform text-to-speech ("TTS") processing to convert text to computer-synthesized speech, e.g., using one or more voice synthesizers.

However, in some cases, because client device 106 may be relatively constrained in terms of computing resources (e.g., processor cycles, memory, battery, etc.), speech capture module 110 local to client device 106 may be configured to convert a finite number of different spoken phrases-particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

In various implementations, invocation module 113 may be configured to determine whether to invoke automated assistant 120, e.g., based on output provided by speech capture module 110 and/or visual cue module $112_1$ (which in some implementations may be combined with image capture module 111 in a single module). For example, invocation module 113 may determine whether a user's utterance qualifies as an invocation phrase that should initiate a human-to-computer dialog session with automated assistant 120.

In some implementations, invocation module 113 may analyze data indicative of the user's utterance, such as an audio recording or a vector of features extracted from the audio recording (e.g., an embedding), alone or in conjunction with one or more visual cues detected by visual cue module $112_1$. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.).

In some implementations, one or more on-device invocation models, e.g., stored in an on-device model database 114, may be used by invocation module 113 to determine whether an utterance and/or visual cue(s) qualify as an invocation. Such an on-device invocation model may be trained to detect variations of invocation phrases/gestures. For example, in some implementations, the on-device invocation model (e.g., one or more neural networks) may be trained using training examples that each include an audio recording (or an extracted feature vector) of an utterance from a user, as well as data indicative of one or more image frames and/or detected visual cues captured contemporaneously with the utterance. In some such implementations, the on-device invocation model 114 may generate output in the form of a probability p that a captured utterance constitutes an invocation phrase meant to awaken automated assistant 120.

In FIG. 1, on-device model database 114 may store one or more on-device invocation models $114_1$-$114_N$. In some implementations, a default on-device invocation model $114_1$ may be trained to detect, in an audio recording or other data indicative thereof, one or more default invocation phrases or hot word(s), such as those mentioned previously (e.g., "OK Assistant," "Hey, Assistant," etc.). In some such implementations, these models may always be available and usable to transition automated assistant 120 into a full listening state in which any audio recording captured by speech capture module 110 (at least for some period of time following invocation) may be processed using other components of automated assistant 120 as described below (e.g., on client device 106 or by one or more cloud-based automated assistant components 119).

Additionally, in some implementations, on-device model database 114 may store, at least temporarily, one or more additional "contextual invocation models" $114_2$-$114_N$. These contextual invocation models $114_2$-$114_N$ may be used by and/or available to (e.g., activated) invocation module 113 in specific contexts. Contextual invocation models $114_2$-$114_N$ may be trained to detect, e.g., in an audio recording or other data indicative thereof, one or more context-specific hot words. In some implementations, contextual invocation models $114_2$-$114_N$ may be selectively downloaded on an as-needed basis, e.g., from a hot command engine 128 in FIG. 1 forms part of cloud-based automated assistant components 119 but can also be implemented in whole or in part on client device 106, as will be described in more detail below.

In various implementations, when invocation module 113 detects various dynamic hot words using contextual invocation models $114_2$-$114_N$, it may transition automated assistant 120 into the full listening state described previously. Additionally or alternatively, invocation module 113 may transition automated assistant 120 into a context-specific state in which one or context-specific responsive actions are performed with or without transitioning automated assistant 120 into the general listening state. In many cases, the audio data that triggered transition of automated assistant 120 into a context-specific state may not be transmitted to the cloud. Instead, one or more context-specific responsive actions may be performed entirely on client device 106, which may reduce both the response time and the amount of information that is transmitted to the cloud, which may be beneficial from a privacy standpoint.

In some implementations, automated assistant 120, and more particularly, speech capture module 110, may perform STT processing on utterances that are detected under circumstances other than contemporaneously with invocation of automated assistant 120. For example, in some implementations, speech capture module 110 may perform STT processing on all captured utterances, on utterances that are captured in particular contexts, and so forth. The text generated from this STT processing may then be analyzed by various components described herein to, for instance, invoke automated assistant 120, perform various responsive actions, and so forth.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars (which will alternatively be referred to herein as "templates" in some cases), in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service 130 may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS. 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, operating a smart appliance, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Hot command engine 128 may be configured to selectively enroll textual commands as hot commands, e.g., in database 129, based on various signals. Although depicted as part of cloud-based automated assistant components 119 in FIG. 1, in various implementations, hot command engine 128 and/or database 129 may additionally or alternatively be implemented in whole or in part on one or more client devices 106. Likewise, in some implementations, database 129 may be maintained in whole or in part on client device 106 that includes hot commands that were enrolled for a particular user, e.g., the user that controls client device 106.

In various implementations, hot command engine 128 may be configured to determine that a textual command, e.g., generated by STT 117A/117, satisfies a frequency threshold in a corpus of textual commands (e.g., a corpus of textual commands received after automated assistant 120 is invoked). For example, the textual command may appear in the corpus of past textual commands more than some minimum number of times, or may appear at some frequency or percentage that matches or exceeds some minimum threshold. In response to this determining, hot command engine 128 may enroll data indicative of the textual command in database 129 (and/or a local database of client device 106). These data indicative of the textual command may or may not include the textual command itself verbatim, an embedding generated from the hot command, a template or grammar (described below) generated from the hot command, and so forth. Subsequent to the enrolling by hot command engine 128, utterance of another textual command that matches, or is semantically consistent, with the textual command may trigger performance of a responsive action by automated assistant 120, without requiring explicit invocation of automated assistant 120.

In some implementations, hot commands enrolled by hot command engine 128 using techniques described herein may be stored as grammars or "templates" that include one or more slots. In some cases, these slots may be represented by wildcards or other similar mechanisms such that the slots can receive subsequent parameter(s) that are semantically consistent with parameter(s) provided in spoken command(s) that resulted in the hot command being enrolled. Two different values are "semantically consistent" when they are interchangeably usable in a slot.

For example, suppose over time a user issues the following commands after invoking automated assistant 120: "Set a timer for five minutes," "set a timer for twenty minutes," and "set a timer for one hour." The values "five minutes," "twenty minutes," and "one hour" are semantically consistent—they all refer to time intervals. Consequently, a hot command template such as "set a timer for <time>" may be generated and enrolled so that the user need not invoke automated assistant 120 before issuing semantically consistent commands moving forward.

Other values other than time intervals may be semantically consistent with each as well. For example, in the context of controlling smart appliances, different smart light identities (e.g., "kitchen light 1," "living room light 4," "den lights," "back porch lights") may be semantically consistent. Likewise, appliances that are controllable using similar commands may be semantically consistent. For example, the template "turn the <appliance> up" can refer to volume of an audio system, a thermostat temperature, an oven temperature, an air conditioner, a light intensity of a smart light, and so forth. Different people may be semantically consistent in the context of hot commands as well—e.g., "send a message to <person's name>" can be used to send a message to different people depending on whose name is inserted into the slot.

Automated assistant 120 may be invoked in various ways, depending on the functionality available at client device 106 and/or at speech capture module 110. FIGS. 2A-B schematically depict two example pipelines for invoking automated assistant 120 to cause automated assistant 120 to perform a responsive action. Selected aspects of the present disclosure may be implemented in whole or in part on either pipeline, or on other pipelines that share various characteristics with those depicted in FIGS. 2A-B.

FIG. 2A depicts a pipeline in which automated assistant 120 relies primarily on cloud-based STT module 117 to perform speech recognition processing. Starting from left, an utterance is captured by speech capture module 110, e.g., as recorded audio data. Speech capture module 110 extracts various audio features from the recorded audio data, such as phonemes, intonation, pitch, cadence, etc. Invocation module 113 applies these features as inputs across an invocation model 114 to generate a probability p that the captured utterance was meant to invoke automated assistant 120.

If at 240, p fails to satisfy T, then the utterance may be ignored/discarded at 242. However, at 240, if p satisfies some threshold T (e.g., p>0.75, p>0.65, p>0.9, etc.), then processing may proceed back to speech capture module 110, which may capture/buffer audio data containing a spoken command issued after, before, or intermixed with the utterance that was processed previously. Speech capture module 110 may pass this command data (e.g., raw audio data, embedding, etc.) to STT module 117 (cloud-based or onboard client device 106) for speech recognition processing.

STT module 117 may generate a textual command that is then provided to intent matcher 135, which may process the command as described above (e.g., via natural language processor 122). The intent determined by intent matcher 135 may be provided to fulfillment module 124. Fulfillment module 124 may fulfill the intent as described previously, e.g., by performing one or more responsive actions. As indicated by the intervals at bottom of FIG. 2A, until automated assistant 120 is successfully invoked and the spoken command is captured/buffered by speech capture module 110, automated assistant 120 may be in a "limited listening state" in which it is responsive primarily or exclusively to default hot words or other invocation triggers (e.g., pressing a hot key). After invocation, automated assistant 120 is in a "full listening state" in which it will perform STT processing on, and attempt to fulfill, any utterance captured by speech capture module 110.

FIG. 2B depicts an alternative pipeline in which STT processing is implemented primarily or exclusively onboard client device 106. Performing STT processing on-device may present a variety of technical advantages, such as preserving privacy by sending less data to the cloud, and particularly by reducing latency associated with interpretation of spoken commands. Spoken commands processed using the pipeline of FIG. 2B may in many cases be processed much more quickly than spoken commands issued using the pipeline of FIG. 2A. This is especially true in implementations in which enrolled hot commands and/or data indicative of enrolled hot commands are cached locally, e.g., in memory of client device 106, as will be described below.

In FIG. 2B, an utterance is captured by speech capture module 110. Speech capture module 110 generates and provides audio data to STT module 117A (onboard client device 106). STT module 117A performs speech recognition processing to generate textual data ("TXT." in FIG. 2B) that is provided to a downstream component such as invocation module 113 and/or hot command engine 128.

Whichever downstream component receives the textual data from STT module 117A, that component may analyze the text to make a decision at 244. If the analysis reveals that the utterance was a default hot word or phrase meant to invoke automated assistant 120, then processing may proceed back to speech capture module 110, which may receive and/or provide, from a buffer, additional audio data that contains a spoken command (which may follow, precede, or be intermixed with the initial utterance). Processing may then proceed through components 117, 135, and 124 as described previously.

However, at 244, it may alternatively be determined that the textual data contains a hot command. Should that be the case, then additional STT processing may not be necessary. Instead, and as depicted in FIG. 2B, the hot command may be provided directly to intent matcher 135, which may generate the intent for processing by fulfillment module 124. A textual snippet may be deemed a hot command based on various factors. In some implementations, if the textual command is similar to, e.g., semantically consistent with, an enrolled hot command, the textual command may be deemed a hot command.

Additionally or alternatively, in some implementations, the textual command may be applied as input across a trained machine learning model to generate output. The output may be indicative of a probability that the textual command was directed to automated assistant 120. In some implementations, the machine learning model may be trained using free-form commands/queries that are issued by users after the users explicitly invoke automated assistant 120.

Additionally or alternatively, as depicted by the dashed arrow in FIG. 2B, in some implementations, rather than sending the enrolled hot command to intent matcher 135, the enrolled hot command may already be cached locally, e.g., on client device 106 as part of the enrollment process. In some such implementations, when an enrolled hot command is subsequently detected in a spoken utterance, responsive action(s) may be triggered based on the cached enrolled hot command, without the enrolled hot command being processed by cloud-based automated assistant components 119.

In some implementations, information that is responsive to the textual command, such as search results, may be cached. The cached information may be output in response to a subsequent invocation of the hot command, in lieu of the textual command being triggered. For example, suppose a user frequently asks automated assistant 120, "What's the weather today?" This query may be enrolled as a hot command. In some such implementations, the query may be automatically submitted to an appropriate search engine, e.g., periodically, randomly, every morning, etc. When the user later asks, "what's the weather today" (e.g., without having to invoke automated assistant 120 first), the responsive data may already be cached, so that automated assistant 120 can output the weather with little or no discernable latency.

Cached hot commands are not limited to search queries. In some implementations, hot commands for controlling smart appliances may be cached (e.g., as part of an enrollment process) onboard client device 106, e.g., to avoid communication with cloud-based automated assistant components 119 and/or to reduce latency. Subsequent invocation of such hot commands may cause data indicative of the hot commands to be transmitted directly to smart appliances. As used herein, transmitting data "directly" to a smart appliance may refer to transmitting data to the smart appliance over one or both of a local area network ("LAN") and/or a personal area network ("PAN"), without exchanging data with remote components (e.g., 119) over one or more wide-area networks ("WAN").

For example, some smart appliances such as smart lights or smart locks may be in wireless communication with a bridge component using technologies such as Bluetooth, mesh network(s), etc. The bridge component may in turn be reachable via one or more other types of wireless networks, such as Wi-Fi. Put another way, the bridge component acts as a "bridge" between a first wireless communication network (e.g., Bluetooth, mesh) on which the smart appliance(s) reside and a second wireless communication network (e.g., Wi-Fi) on which users typically operate client devices 106.

Cached hot commands (or data indicative thereof) may be transmitted directly from client device 106 to the bridge component—or to the smart appliances themselves if no bridge component is present-without exchanging any data with cloud-based automated assistant components 119. Receipt of the data indicative of the cached hot command may cause the smart appliance to perform a responsive action. For example, suppose the command "turn on the lights" is enrolled as a hot command. In some implementations, this enrollment may include command data that is actually communicated to the lights (or to a bridge component that controls the lights) being cached. Consequently, when the hot command is detected later, that cached data may be immediately transmitted to the lights/bridge component over a LAN/PAN, with little or no discernable latency.

With the pipeline of FIG. 2B, automated assistant 120 performs STT processing more often than with the pipeline of FIG. 2A. Accordingly, rather than having a "limited listening state" like in FIG. 2A, in FIG. 2B, automated assistant 120 has what is referred to herein as a "selectively responsive state" in which automated assistant selectively responds to textual commands/queries as described previously with regard to the decision making of 244. Should automated assistant 120 be explicitly invoked, e.g., with a default hot word, then automated assistant 120 may transition into a "fully responsive state."

In the selectively responsive state, automated assistant 120 selectively responds to a textual command based on various factors. One such factor is whether the textual command (or a similar textual command, or a matching grammar/template) was previously enrolled as a hot command. Another factor is whether the speaker's gaze is directed towards a computing device that, at least from the user's perspective, appears to implement at least of part of automated assistant 120. Other factors are contemplated herein. In the fully responsive state of the implementation of FIG. 2B, automated assistant 120 may transmit data (e.g., STT textual output) indicative of any utterance it detects to cloud-based automated assistant components 119 for additional processing.

Figure 3A:
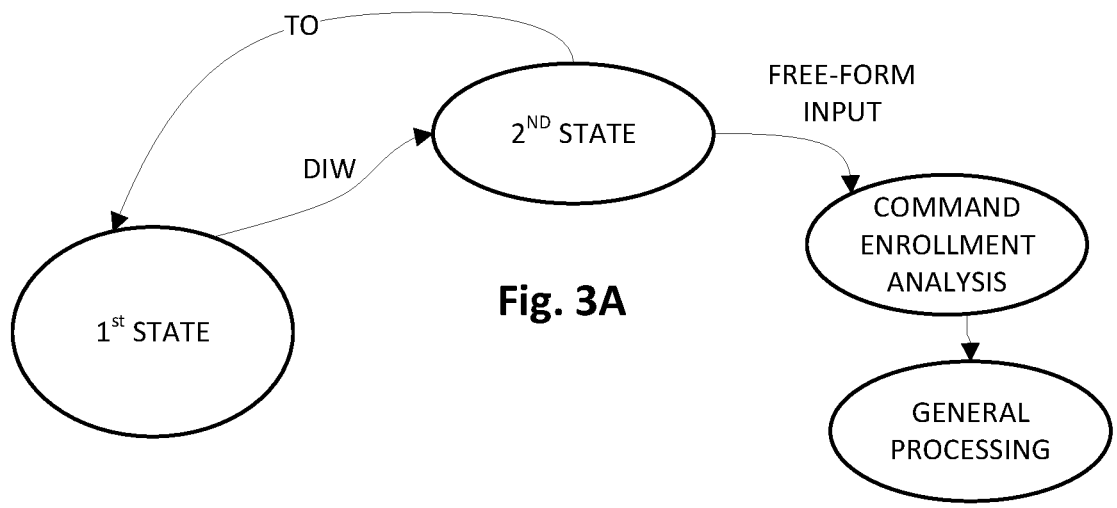
FIGS. 3A, 3B, and 3C schematically depict stages of an example state machine that may be implemented by an automated assistant and/or an assistant device configured with selected aspects of the present disclosure, in accordance with various implementations.
Figure 3B:
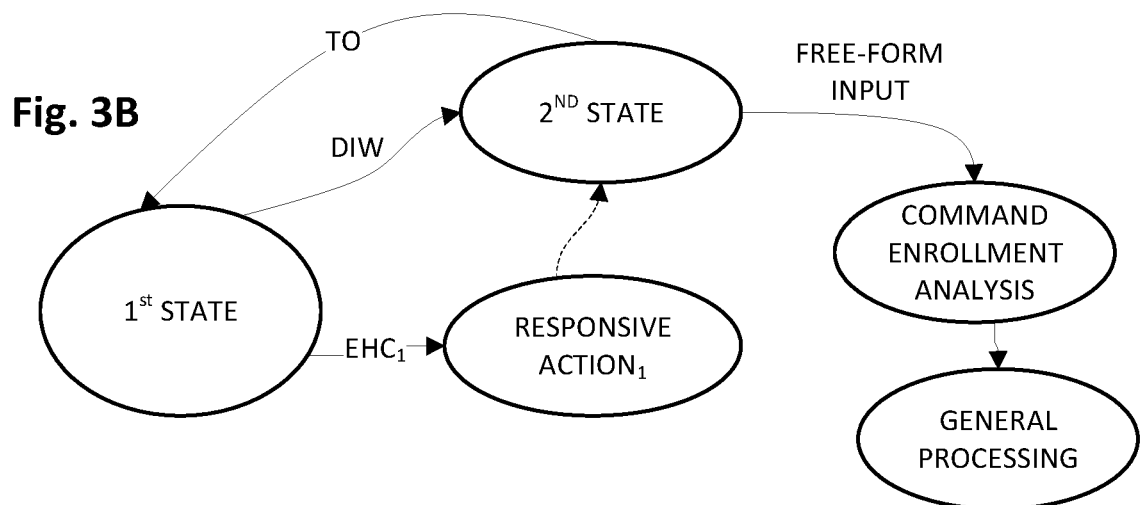
Figure 3C:
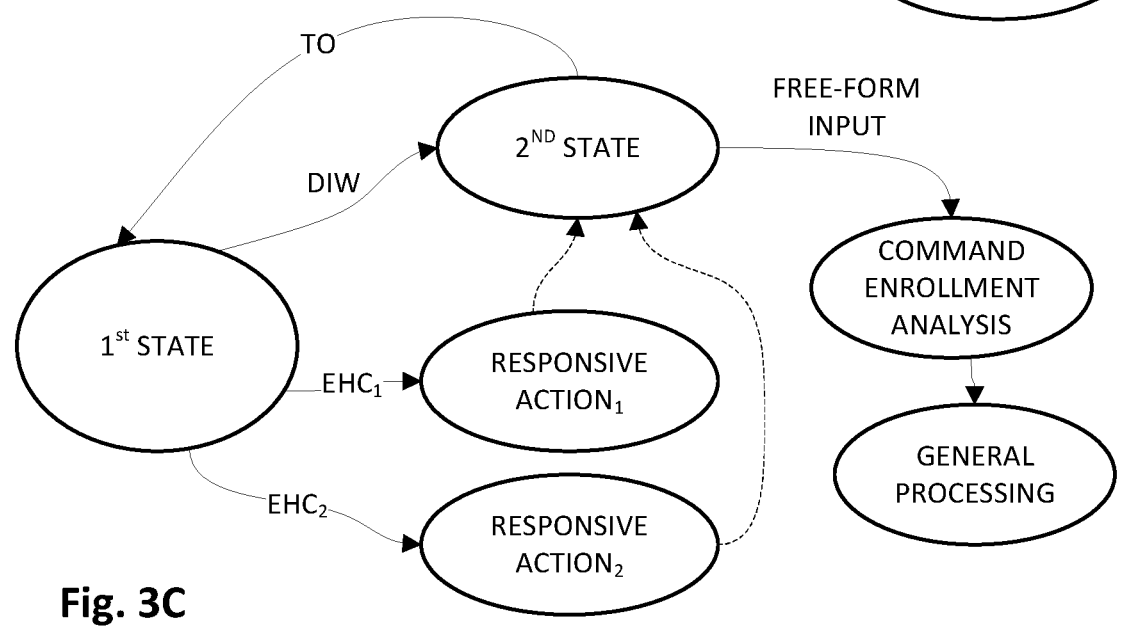

FIGS. 3A-C schematically depict stages of an example state machine that may be implemented by an automated assistant (e.g., 120) and/or an assistant device (e.g., 106) configured with selected aspects of the present disclosure, in accordance with various implementations. Beginning at the left side of FIG. 3A, automated assistant 120 may begin or default to a first state, which may be the limited listening state of FIG. 2A or the selectively responsive state of FIG. 2B. Upon detection of one or more default hot words ("DIW" in FIGS. 3A-C), automated assistant 120 may transition into a second state, which may correspond to the fully listening state of FIG. 2A or the fully responsive state of FIG. 2B.

In the second state, automated assistant 120 may await any free-form input, such as a spoken utterance. Upon detection of free-form input, automated assistant 120 may transition at least temporarily into a "command enrollment analysis" state. In the command enrollment analysis state, automated assistant 120, e.g., by way of hot command engine 128, may determine, based on a variety of factors, whether the free-form input should be enrolled as hot command that is usable in the future without requiring that automated assistant 120 be transitioned from the first state to the second state. While shown in series with "general processing," in some implementations, command enrollment analysis and general processing may be performed in parallel, or command enrollment analysis may be performed after general process, e.g., to ensure that the command was valid and that automated assistant 120 was able to respond.

Chief among the factors considered during command enrollment analysis is a frequency at which the command, or semantically consistent commands, are received. For example, a count of the times the command, or a semantically-consistent command, is received may be compared to a threshold. If the threshold is satisfied, the textual command, or a template/grammar assembled from the command and its slots, may be enrolled as a hot command that is usable moving forward without requiring that automated assistant 120 be explicitly invoked. Meanwhile, regardless of whether the free-form input is enrolled as a hot command, it may be subjected to general processing (e.g., by intent matcher 135 and/or fulfillment module 124) to perform a responsive action.

FIG. 3B depicts the state machine of FIG. 3A after a first enrolled hot command ("EHC$_1$") has been enrolled as a consequence of the command enrollment analysis. Now, when automated assistant 120 is in the first state, it may be invoked as before into the second state. However, automated assistant 120 may also be responsive to the first enrolled hot command EHC$_1$ to perform a first responsive action ("Responsive Action$_1$"). As indicated by the dashed arrow, in some implementations, once the first responsive action is performed, automated assistant 120 may transition into the second state, e.g., so that the user can follow up the enrolled hot command with whatever query the user wishes. This enrollment process may repeat into the future. For example, FIG. 3C depicts the state machine of automated assistant 120 after another enrollment hot command ("EHC$_2$") has been enrolled.

Figure 4A:
FIGS. 4A and 4B depict example dialogs between a user and an automated assistant configured with selected aspects of the present disclosure.
Figure 4B:

FIGS. 4A and 4B demonstrate one example of how a human-to-computer dialog session between user 101 and an instance of automated assistant (not depicted in FIGS. 4A-B) may occur, via the microphone(s) and speaker(s) of a client computing device 406 (depicted as a standalone interactive speaker but this is not meant to be limiting) according to implementations described herein. One or more aspects of automated assistant 120 may be implemented on the computing device 406 and/or on one or more computing devices that are in network communication with the computing device 406.

In FIG. 4A, user 101 invokes automated assistant 120 using the default hot phrase, "Hey Assistant." This may cause automated assistant 120 to transition from the first state in FIGS. 3A-C to the second state. Then, user 101 says, "Set a timer for five minutes." This phrase may be processed according to both the command enrollment analysis and general processing of FIGS. 3A-C. Suppose for this example that user 101 (and/or other users, depending on the implementation) has issued this command, or a semantically consistent command (e.g., "Set a timer for ten minutes"), some number of times that satisfies some minimum hot command enrollment threshold.

Automated assistant 120 may first respond by setting a timer and saying, "OK. Timer starting . . . now." However, because the command (and/or semantically consistent commands) satisfies a hot command enrollment criterion (e.g., the minimum hot command enrollment threshold mentioned previously), automated assistant 120 enrolls the command, or more generally, a template or grammar generated from the command and its slot(s), as an enrolled hot command. Upon doing so, automated assistant notifies user 101, "I see that you issue this command often, so I have changed my settings so that you no longer need to wake me up before issuing that command . . . you can just say set a timer for X minutes." Consequently, and as shown in FIG. 4B, user 101 later can simply utter the command, "Set a timer for six minutes," and automated assistant 120 will start the timer without being explicitly invoked, first.

In addition to or instead of frequency of use, in some implementations, other factors and/or signals may be used to determine whether a command should be interpreted as a hot command, and/or whether to enroll a command as a hot command moving forward. Additionally or alternatively, in some implementations, repeated utterances of a command, one after the other, may cause the command to be interpreted and/or enrolled as a hot command. Intuitively, if a user says something like, "Turn the lights red," waits, then repeats the same thing one or more times, that suggests the user is waiting for automated assistant 120 to turn the lights red.

Figure 5A:
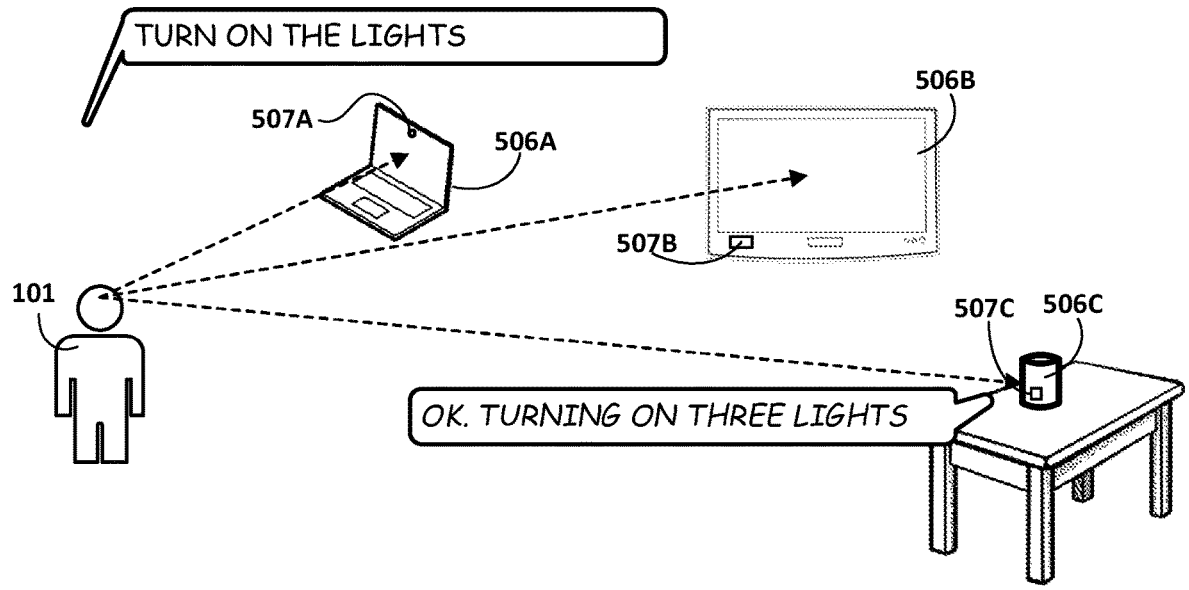
FIGS. 5A and 5B depict more example dialogs between a user and an automated assistant configured with selected aspects of the present disclosure.
Figure 5B:
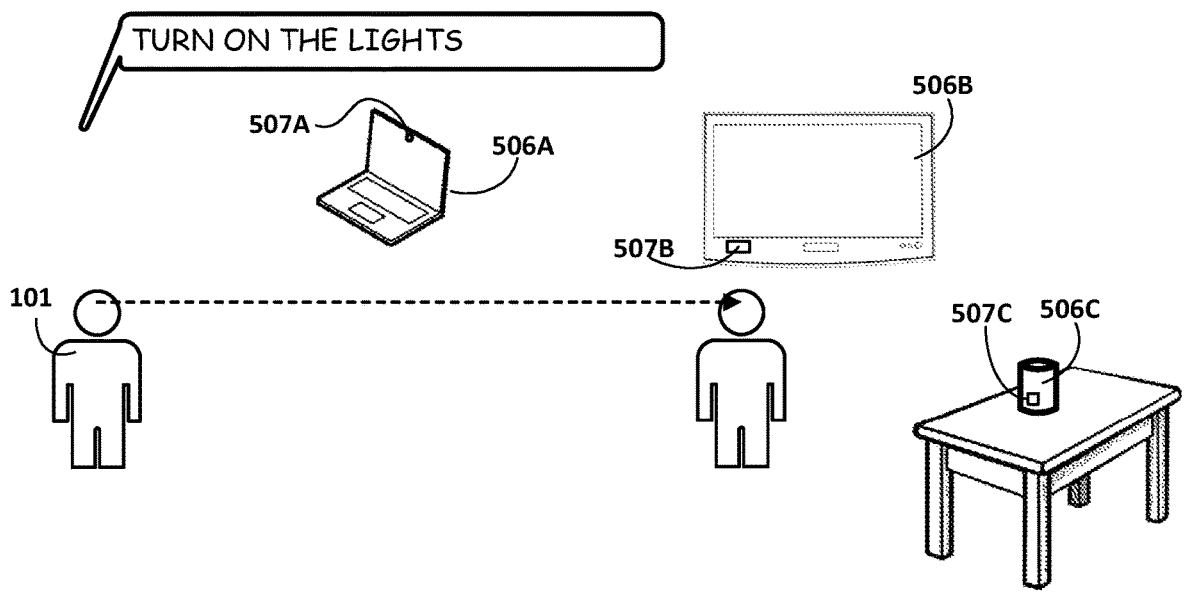

FIGS. 5A-B depict an example in which a gaze of a user 101 is used to determine whether the user's utterance was meant for automated assistant 120. Once again user 101 engages with automated assistant 120 that operates at least in part on client device 506C. Client device 506C includes a vision sensor 507C that generates a vision data that can be analyzed to determine a direction of the user's gaze. Two other client devices, a laptop 506A and a smart television 506B, are also present and include respective vision sensors 507A and 507B.

In FIG. 5A, user 101 says, without invoking automated assistant 120 first, "Turn on the lights." Vision data generated by one or more of vision sensors 507A-C may be analyzed, e.g., using gaze detection algorithms, to determine a direction of the user's gaze. If user 101 is looking in the direction of any of client devices 506A-C (as indicated by the dashed arrows in FIG. 5A), that may be a signal that is used, alone or in combination with other signals, to determine whether the command should be responded to by automated assistant 120. In the case of FIG. 5A, automated assistant 120 responds, "OK. Turning on three lights."

Contrast that to FIG. 5B, where a first user 101A says, to another user 101B, "Turn on the lights." As shown by the dashed arrow, a gaze of the first user 101A is directed at the second user 101B. This may be detected once again based on vision data gathered by one or more of client devices 506A-C using vision data captured by one or more of their respective vision sensors 507A-C. Consequently, automated assistant 120 takes no action, under the assumption that second user 101B is being instructed to turn on the lights.

In some implementations, the direction of a speaker's gaze may not be available or ascertainable, e.g., because of where the speaker is located (e.g., out of view of any vision sensors 507). Or, there may not be sufficient hardware resources, such as vision sensors, to determine the direction of the speaker's gaze. However, signals from other sensors, such as microphones or proximity sensors, may be analyzed to determine whether multiple people are co-present in the area. If there are multiple people present, like in FIG. 5B, that may weigh against interpreting someone one of those people says, potentially to another of those people, as a command directed at automated assistant 120.

In some implementations, textual data generated from the utterance of user 101 may be applied as input across the aforementioned machine learning model to generate a probability that the command was directed at automated assistant 120. That probability may not be dispositive alone—after all, "turn on the lights" is a command that could be followed by another person in the room—but in combination with the gaze of user 101 targeting a client device on which automated assistant 120 can be at least perceived to be executing, the combined signals may suffice to trigger a response by automated assistant 120. Additionally or alternatively, rather than detecting the user's gaze direction, in some implementations, it may be determined whether user 101 is alone. If the answer is yes, even without detecting his or her gaze direction, it may be inferred that user 101 is addressing automated assistant 120.

Figure 6:
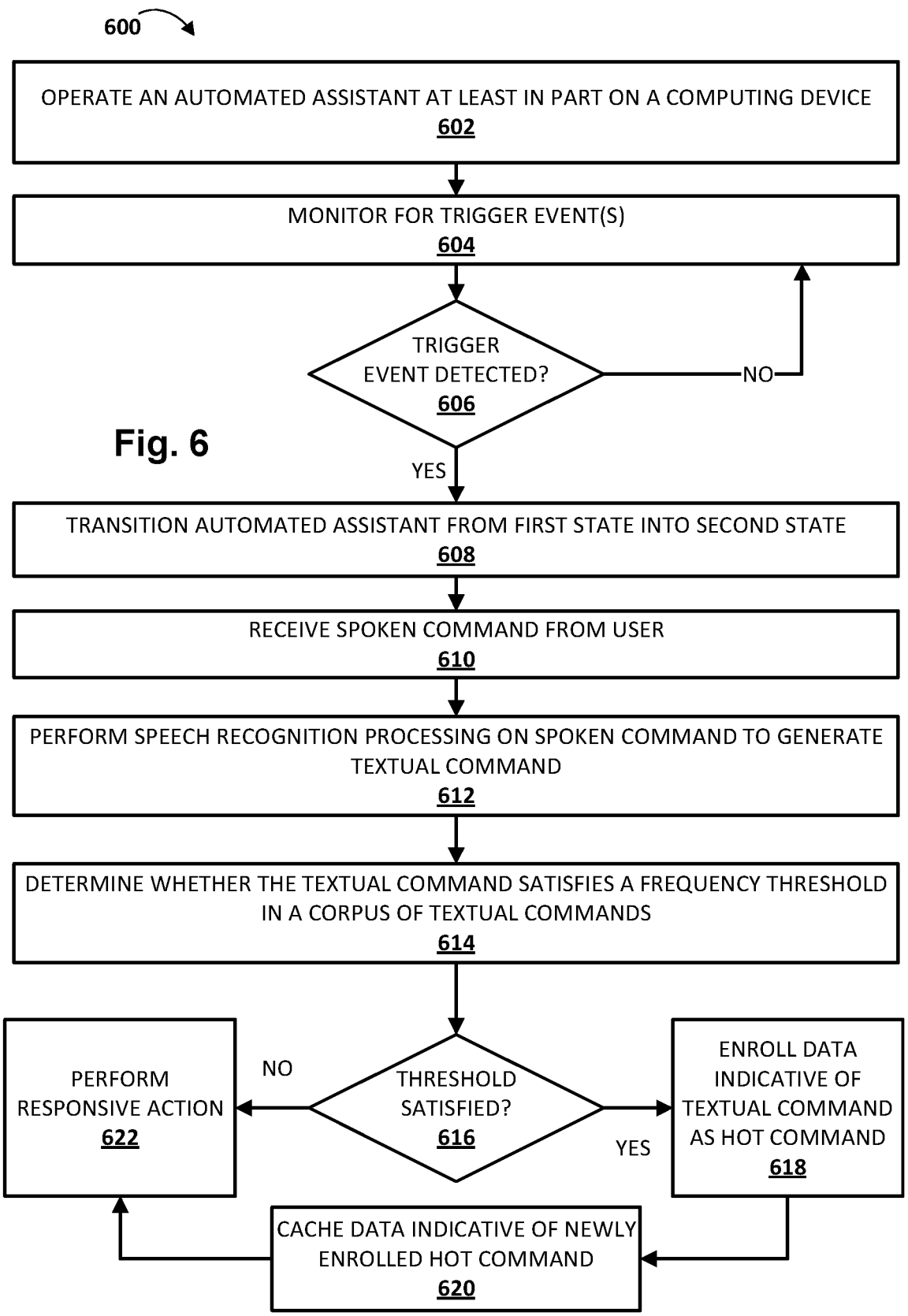
FIG. 6 depicts a flowchart illustrating an example method according to implementations disclosed herein.

FIG. 6 is a flowchart illustrating an example method 600 according to implementations disclosed herein. For convenience, the operations of the flow chart are described with reference to a system that performs the operations. This system may include various components of various computer systems, such as one or more components of automated assistant 120. Moreover, while operations of method 600 are shown in a particular order, this is not meant to be limiting. One or more operations may be reordered, omitted or added.

At block 602, the system may operate automated assistant 120 at least in part on one or more client devices, such as 106, 406, or 506A-C. At block 604, the system may monitor for one or more trigger events. For example, the system may monitor audio data captured at one or more microphones for one or more default hot words that are meant to invoke automated assistant 120. As noted above, in some implementations, this may involve extracting and applying features of audio data as input across one or more invocation models 114. In other implementations, the system may perform speech recognition processing (also referred to herein as STT processing) on audio data capturing the utterance. The resulting generated textual snippet may be analyzed to determine whether it contained hot word(s). In some implementations, events other than detection of default hot words may invoke automated assistant 120, such as pressing one or more hard or soft keys, making a gesture in front of a vision sensor, making a particular gesture or motion while holding a mobile phone on which automated assistant 120 is accessible, and so forth.

If, at block 606, one or more triggering events are not detected, then method 600 may proceed back to block 604. However, if the answer at block 606 is yes, then at block 608, the system may transition automated assistant 120 from a first state, such as a limited listening state (FIG. 2A) or selectively responsive state (FIG. 2B), into a second state, such as a full speech recognition state (FIG. 2A) or fully responsive state (FIG. 2B).

While in the second state, at block 610, the system, e.g., by way of speech capture module 110, may receive a spoken command from a user, which may be captured as audio data. At block 612, the system, e.g., by way of cloud-based STT module 117 or local STT module 117A, may perform speech recognition processing on the audio data generated from the spoken command received at block 610 to generate a textual command.

At block 614, the system, e.g., by way of hot command engine 128, may determine whether the textual command satisfies a frequency threshold in a corpus of textual commands (the command enrollment analysis of FIGS. 3A-C). In various implementations, the corpus of textual commands may be a corpus of textual commands generated by the speaking user, or a corpus of textual commands generated by a population of users, including the user. In some implementations, a count associated with the textual command may be compared to the frequency threshold at block 616. This count may be determined in various ways, as will be described below.

At block 616, if the threshold is satisfied, then at block 618, the system may enroll data indicative of the textual command as a hot command. Subsequent to the enrolling at block 618, utterance of another textual command that matches, or is semantically consistent with (e.g., matches a template/grammar), the textual command may trigger performance of a responsive action by automated assistant 120, without requiring explicit invocation of automated assistant 120.

In some implementations, only the same user who caused enrollment of a hot command may then use the hot command to trigger action by automated assistant 120 without invocation. This user may be identified across multiple dialog sessions using, for instance, speaker recognition processing, facial recognition processing (e.g., when one or more cameras are present), and so forth. In other implementations, once a hot command is enrolled, it may be used by more than the user who caused it to be enrolled, such as other registered users (e.g., family members), or users at large.

In some implementations, at optional block 620, the system may cache data indicative of the textual command, such as the textual command itself, in local memory of one or more client devices 106 that at least partially implement automated assistant 120. This may provide various benefits relating to latency of automated assistant 120 in responding to similar commands in the future. For example, in some implementations, the textual command may be triggered automatically (e.g., periodically), without the textual command being explicitly invoked by a person, in order to cache information that is responsive to the textual command. This may be particularly helpful where the textual command causes automated assistant 120 to output informational responses to queries such as "what's the weather outside?" or "what's on my calendar today?" The periodically re-cached information may be output by automated assistant 120 directly in response to a subsequent invocation of the textual command, in lieu of the textual command being processed remotely, e.g., at cloud-based automated assistant components 119, to resolve the speaker's request.

In some implementations, enrolled hot commands (or data indicative thereof) that control smart appliances may be cached to improve latency when instructing automated assistant 120 to control these smart appliances in the future. Invocation of such cached textual commands may cause the textual command, or data indicative of the textual command such as a proprietary instruction configured for controlling a proprietary smart appliance, to be transmitted directly to a smart appliance over one or both of a LAN and a PAN. As noted previously, receipt of the textual command or data indicative thereof may cause the smart appliance to perform a responsive action. All this may happen without the textual command being processed remotely, e.g., at cloud-based automated assistant components 119.

After block 618 (or optional block 620), method 600 may then proceed to block 622, at which point automated assistant 120 may perform a responsive action. If the answer at block 616 was no, then method 600 may proceed directly to block 622, skipping blocks 618-620. In some implementations, at this juncture, the count associated with the command may be incremented. In some implementations, a count of a particular textual command may be incremented each time the command is uttered by anyone, or by anyone who is a member of a predefined group (e.g., user's registered as part of a family). In some implementations, counts of particular textual commands may be accumulated across a coordinated ecosystem of client devices (e.g., smart speakers, smart phones, tablets, assistant devices contained in a household). For example, one or more users may have accounts associated with automated assistant 120, and the users may access these accounts on any client device of such an ecosystem. When these accumulated counts satisfy the frequency threshold of block 616, these particular textual commands may be selectively enrolled as hot commands for the ecosystem. This may effectively cause the hot commands to be widely available in an environment in which client devices of the ecosystem are deployed, such as in household, in vehicles driven by members of the household, on mobile phones carried by members of the household, etc.

Similarly, in some implementations, when textual commands (or templates/grammars generated therefrom) are enrolled as hot commands, they may be enrolled on an individual user basis, on a multi-user basis (e.g., available to members of a household and/or to users registered with a particular ecosystem of client devices), or even enrolled for widespread use across a population. In some implementations in which hot commands are enrolled on an individual user basis, when a user utters an enrolled hot command, automated assistant 120 may first attempt to ascertain the speaker's identity and/or match the speaker to a registered user profile. For example, automated assistant 120 may perform speaker recognition processing (or voice matching), facial recognition processing (if a vision sensor is available) to determine an identity of the speaker, or at least to match the speaker to an enrolled voice profile. If the speaker is not recognized, in some implementations, automated assistant 120 may ignore the enrolled hot command. On the other hand, if the speaker is recognized, the spoken utterance may be analyzed using techniques described herein to determine whether automated assistant 120 should take responsive action.

As noted above, in some implementations, hot commands are enrolled for multiple users, e.g., members of a household or users registered with a defined ecosystem of client devices (e.g., client devices and networked appliances in a household). In some such implementations, any of those registered users may be able to utter enrolled hot commands to a client device of the ecosystem. So long as the speaker is able to be matched to a registered user profile (or more generally, registered as someone who is allowed to utter commands to automated assistant 120 even without a predefined profile), e.g., using voice matching or facial recognition, automated assistant 120 may take responsive action without being invoked first.

In FIG. 6, the textual command is selectively enrolled as a hot command based on whether the frequency threshold of block 614 is satisfied. However, this is not meant to be limiting. In other implementations, additional or alternative signals and/or techniques may be used to determine whether the textual command should be enrolled as a hot command and/or whether the textual command is indeed addressed to automated assistant 120.

For example, in some implementations, the textual command may be applied, e.g., by invocation module 113, as input across a machine learning model to generate output. The output may be indicative of a probability that the textual command was directed to the automated assistant. In some such implementations, the enrolling of block 616 is further in response to the probability conveyed by the machine learning model output satisfying a threshold. Additionally or alternatively, in some implementations, the conditional enrolling of block 616 may be further conditioned on detecting, based on vision data captured by one or more cameras, that the user's gaze is directed at a computing device on which the automated assistant is at least partially implemented, as depicted in FIG. 5A.

In yet other implementations, the conditional enrolling of block 616 may be further conditioned on a determination that, during a predetermined time interval after the spoken command, no additional utterances are detected. Suppose a speaker issues a command that is followed by, for instance, five to ten seconds of silence. That may suggest that the speaker is alone—another human conversation participant would likely have responded by then—and therefore must be addressing automated assistant 120. Or, the temporary silence may suggest that anyone else present in the room realized that the speaker was addressing automated assistant 120, and therefore they remained silent.

Additionally or alternatively, in some implementations, the conditional enrolling of block 616 is further conditioned on a determination that, during a predetermined time interval after the spoken command, no responsive action was taken by a person. Suppose a speaker says, "Turn on the lights," but then another person quickly operates a physical switch to turn on the lights. This suggests the speaker was addressing the other person, not automated assistant 120, and therefore, the phrase "turn on the lights" may not be suitable for enrollment as a hot command, at least not at this juncture. On the other hand, if the speaker issues that command and nothing else happens for some predetermined time interval (e.g., five, ten seconds), that suggests the speaker was in fact addressing automated assistant 120, and therefore, the textual command "turn on the lights" should be enrolled as a hot command.

Figure 7:
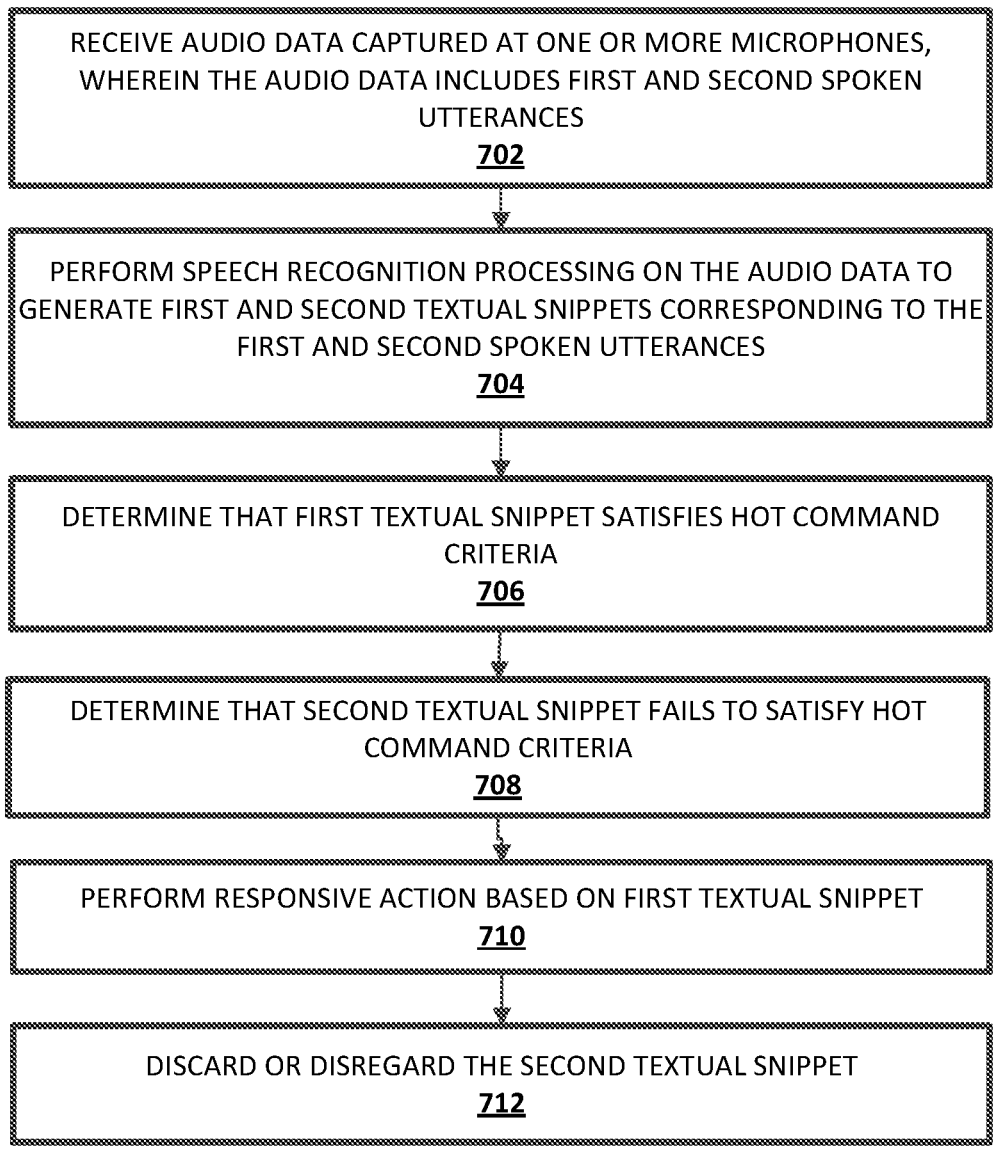
FIG. 7 depicts a flowchart illustrating an example method according to implementations disclosed herein.

FIG. 7 depicts an example method 700 for practicing selected aspects of the present disclosure, in accordance with various implementations, including implementations such as that depicted in FIG. 2B in which STT/speech recognition processing is performed on utterances captured outside of a full listening state (FIG. 2A) or fully responsive state (FIG. 2B). For convenience, the operations of the flow chart are described with reference to a system that performs the operations. This system may include various components of various computer systems. Moreover, while operations of method 700 are shown in a particular order, this is not meant to be limiting. One or more operations may be reordered, omitted or added.

At block 702, the system may receive audio data captured at one or more microphones. The audio data may include multiple spoken utterances captured over time, such as first and second spoken utterances. At block 704, the system may perform speech recognition processing (i.e. STT processing) on the audio data to generate first and second textual snippets corresponding to the first and second spoken utterances.

At bock 706, the system may determine that the first textual snippet satisfies one or more hot command criteria. These "hot command criteria" may be similar to the "hot command enrollment criteria" described herein. For example, the hot command criteria may include but are not limited to whether the speaker's gaze is directed at an assistant device when speaking, whether someone else is co-present with the speaker, whether the speaker is gazing at another person rather than a computing device while speaking, whether some predetermined time interval of silence and/or inaction by a person follows the utterance, whether the textual snippet has been uttered some threshold number of times while automated assistant 120 is in the fully listening (FIG. 2A) or fully responsive (FIG. 2B) states, etc.

At block 708, the system may determine that the second textual snippet fails to satisfy the one or more hot command criteria. At block 710, in response to the determination of block 706, the system may perform a responsive action based on the first textual snippet. At block 712, in response to the determination of block 708, the system may discard or disregard the second textual snippet without performing another responsive action.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Figure 8:
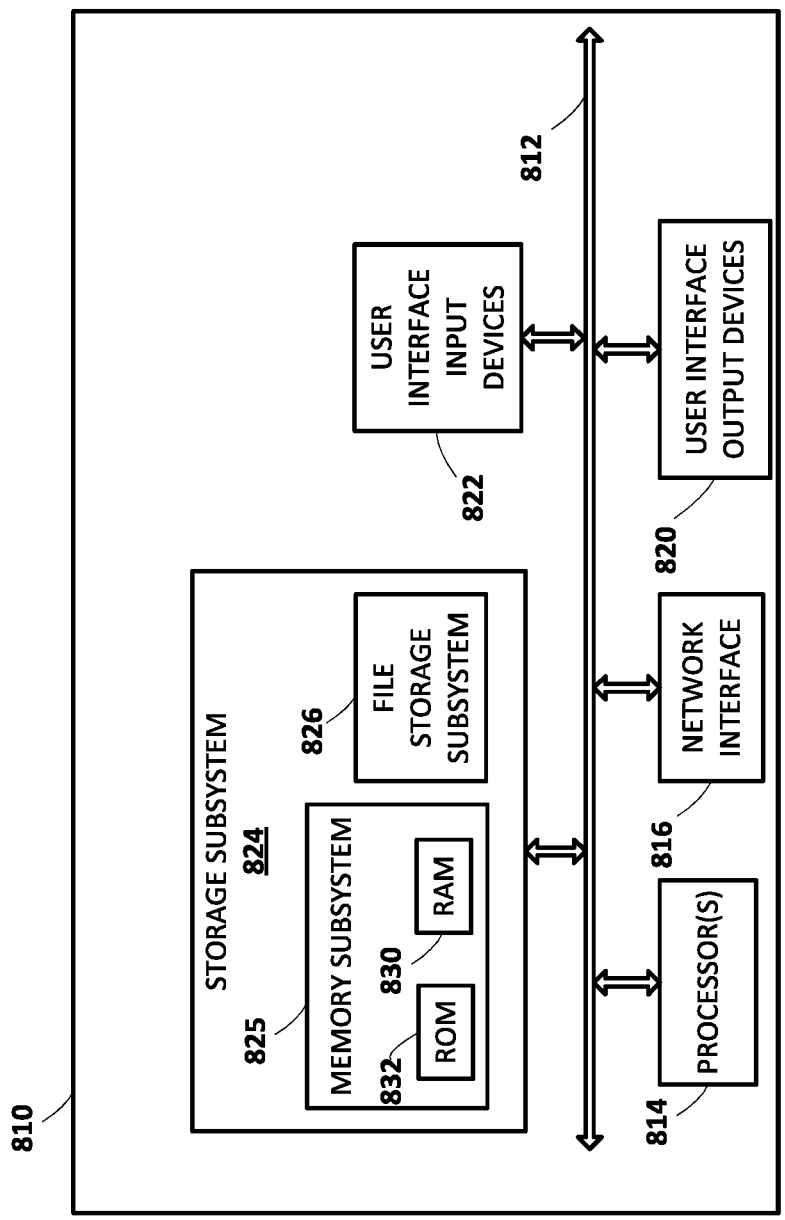
FIG. 8 illustrates an example architecture of a computing device.

FIG. 8 is a block diagram of an example computing device 810 that may optionally be utilized to perform one or more aspects of techniques described herein. In some implementations, one or more of a client computing device, user-controlled resources engine 134, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 6-7, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    operating an automated assistant using one or more of the processors;
    transitioning the automated assistant from a limited listening state into a full speech recognition state in response to a trigger event;
    while in the full speech recognition state, receiving, by the automated assistant, a spoken command from a user;
    performing speech recognition processing on the spoken command to generate a textual command;
    applying the textual command as input across a machine learning model to generate output, wherein the output is indicative of a probability that the textual command was directed to the automated assistant;
    determining that the textual command satisfies a frequency threshold in a corpus of textual commands; and
    based on the output and the determining, enrolling data indicative of the textual command as a hot command, wherein subsequent to the enrolling, utterance of another textual command that is semantically consistent with the textual command triggers performance of a responsive action by the automated assistant, without requiring explicit invocation of the automated assistant.

2. The method of claim 1, wherein the trigger event comprises detection of one or more default hot words in audio data captured by a microphone.

3. The method of claim 1, wherein the corpus of textual commands comprises a corpus of textual commands generated by the user.

4. The method of claim 1, wherein the corpus of textual commands comprises a corpus of textual commands generated by a population of users, including the user.

5. The method of claim 1, further comprising detecting, based on vision data captured by one or more cameras, that the user's gaze is directed at a computing device on which the automated assistant is at least partially implemented, wherein the enrolling is further in response to the detecting.

6. The method of claim 1, wherein the enrolling is further in response to a determination that, during a predetermined time interval after the spoken command, no additional utterances are detected.

7. The method of claim 1, wherein the enrolling is further in response to a determination that, during a predetermined time interval after the spoken command, no responsive action was taken by a person.

8. The method of claim 1, further comprising, in response to the enrolling, caching data indicative of the textual command or the textual command itself in local memory of a computing device that at least partially implements the automated assistant.

9. The method of claim 8, further comprising triggering the textual command subsequent to the enrolling based on the cached data, without the textual command being explicitly invoked, in order to cache information that is responsive to the textual command, wherein subsequent to the triggering, the cached information is output in response to a subsequent invocation of the textual command, in lieu of the textual command being triggered.

10. The method of claim 8, wherein subsequent to the caching, invocation of the textual command causes the data indicative of the textual command to be transmitted directly to a smart appliance over one or both of a local area network ("LAN") and a personal area network ("PAN"), wherein receipt of the data indicative of the textual command causes the smart appliance to perform a responsive action.

11. The method of claim 1, wherein the data indicative of the textual command comprises a template that includes one or more slots to receive one or more subsequent parameters that are semantically consistent with one or more parameters provided in the spoken command received from the user.

12. A system comprising one or more processors and memory storing instructions that, in response to execution of the instructions by the one or more processors, cause the one or more processors to implement an automated assistant, wherein the automated assistant is to:
    receive audio data captured at one or more microphones, wherein the audio data includes first and second spoken utterances;
    perform speech recognition processing on the audio data to generate first and second textual snippets corresponding to the first and second spoken utterances;
    apply the first and second textual snippets as inputs across a machine learning model to generate first and second outputs, wherein the first and second outputs are indicative of first and second probabilities, respectively, that the first and second textual snippets are directed to the automated assistant;
    in response to a determination, based on the first output that the first textual snippet satisfies one or more hot command criteria, perform a responsive action based on the first textual snippet;
    in response to a determination, based on the second output, that the second textual snippet fails to satisfy the one or more hot command criteria, discard or disregard the second textual snippet without performing another responsive action.

13. The system of claim 12, wherein the one or more hot command criteria include enrollment of a textual snippet under consideration in a hot command library, wherein the hot command library includes textual snippets that, when spoken, trigger performance of a responsive action by the automated assistant, without requiring detection of one or more default hot words or transition of the automated assistant into an active listening state.

14. The system of claim 12, further comprising instructions to detect, based on vision data captured by one or more cameras, a first gaze of a user while the user provided the first spoken utterance and a second gaze of the user while the user provided the second spoken utterance.

15. The system of claim 14, wherein the one or more hot command criteria include a gaze being directed at a computing device on which the automated assistant is at least partially implemented.

16. The system of claim 12, wherein the one or more hot command criteria include a determination that, during a predetermined time interval after the spoken command, no additional utterances are detected.

17. At least one non-transitory computer-readable medium comprising instructions that, in response to execution of the instructions by one or more processors, cause the one or more processors to perform the following operations:
   operating an automated assistant using one or more of the processors;
   transitioning the automated assistant from a limited listening state into a full speech recognition state in response to a trigger event;
   while in the full speech recognition state, receiving, by the automated assistant, a spoken command from a user;
   performing speech recognition processing on the spoken command to generate a textual command;
   apply the textual command as input across a machine learning model to generate output, wherein the output is indicative of a probability that the textual command was directed to the automated assistant;
   determining that the textual command satisfies a frequency threshold in a corpus of textual commands; and
   based on the output and the determining, enrolling data indicative of the textual command as a hot command, wherein subsequent to the enrolling, utterance of another textual command that is semantically consistent with the textual command triggers performance of a responsive action by the automated assistant, without requiring explicit invocation of the automated assistant.

18. The at least one non-transitory computer-readable medium of claim 17, wherein the trigger event comprises detection of one or more default hot words in audio data captured by a microphone.

19. The at least one non-transitory computer-readable medium of claim 17, wherein the corpus of textual commands comprises a corpus of textual commands generated by the user.

20. The at least one non-transitory computer-readable medium of claim 17, wherein the corpus of textual commands comprises a corpus of textual commands generated by a population of users, including the user.

* * * * *